US009591677B2

(12) United States Patent
Zhang

(10) Patent No.: US 9,591,677 B2
(45) Date of Patent: Mar. 7, 2017

(54) METHOD OF MANAGING DATA BEARERS IN A WIRELESS ACCESS DEVICE AND UES

(71) Applicant: Alcatel Lucent, Boulogne Billancourt (FR)

(72) Inventor: Kaibin Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 29 days.

(21) Appl. No.: 14/388,982

(22) PCT Filed: Mar. 25, 2013

(86) PCT No.: PCT/IB2013/000699
§ 371 (c)(1),
(2) Date: Sep. 29, 2014

(87) PCT Pub. No.: WO2013/144714
PCT Pub. Date: Oct. 3, 2013

(65) Prior Publication Data
US 2015/0063246 A1 Mar. 5, 2015

(30) Foreign Application Priority Data

Mar. 31, 2012 (CN) .......................... 2012 1 0092831

(51) Int. Cl.
*H04W 4/00* (2009.01)
*H04W 76/02* (2009.01)
(Continued)

(52) U.S. Cl.
CPC ....... *H04W 76/021* (2013.01); *H04L 12/4641* (2013.01); *H04W 76/025* (2013.01);
(Continued)

(58) Field of Classification Search
None
See application file for complete search history.

(56) References Cited

U.S. PATENT DOCUMENTS 8,700,040 B2 * 4/2014 Pancorbo Marcos ............... H04W 76/041 370/331
9,319,932 B2 * 4/2016 Yang ................. H04W 28/0289
(Continued)

FOREIGN PATENT DOCUMENTS

CN 1728579 A 2/2006
CN 101180828 A 5/2008

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300 V10.7.0, pp. 1-194, XP05066409, (Mar. 2013).
(Continued)

*Primary Examiner* — Michael J Moore, Jr.
(74) *Attorney, Agent, or Firm* — Fay Sharpe, LLP

(57) ABSTRACT

In the converged access environment of multiple radio access modes, such as a cellular mobile network and a WLAN etc. the existing technology can't set up and manage the radio bearer, over a WLAN, corresponding to the data bearer in the cellular mobile network. The invention provides a method of managing data bearers in a wireless access device, wherein, the access device integrates the access functions of a first bearer network and a second bearer network, the method comprises the following steps: a. maintaining a radio bearer with UEs, the radio bearer (Wi-Fi radio bearer) being used for bidirectional data transmission and based on the second bearer network; b. maintaining a backhaul data bearer (S bearer) with the connected serving gateways of the first bearer network; c. binding the radio bearer and the backhaul data bearer. By adopting the invention, the backhaul data bearer of a LTE network can seam-
(Continued)

lessly converge with the radio bearer of a Wi-Fi network, thereby achieving that the mobile data traffic is transported over a Wi-Fi.

10 Claims, 3 Drawing Sheets

(51) Int. Cl.
  H04W 84/12 (2009.01)
  H04L 12/46 (2006.01)
  H04W 88/16 (2009.01)
  H04W 88/10 (2009.01)
  H04W 92/12 (2009.01)
(52) U.S. Cl.
  CPC ........... H04W 84/12 (2013.01); H04W 88/16 (2013.01); H04W 88/10 (2013.01); H04W 92/12 (2013.01)

(56) References Cited

U.S. PATENT DOCUMENTS

| | | |
|---|---|---|
| 2003/0223450 A1 | 12/2003 | Bender et al. |
| 2007/0104218 A1 | 5/2007 | Hassan et al. |
| 2010/0158017 A1* | 6/2010 | Casey ............... H04L 12/4658 370/395.53 |
| 2012/0039213 A1* | 2/2012 | Cheng ............... H04W 76/022 370/254 |
| 2012/0092994 A1* | 4/2012 | Wang ................. H04L 45/302 370/235 |
| 2012/0269167 A1* | 10/2012 | Velev ............... H04W 36/0011 370/331 |
| 2012/0275401 A1* | 11/2012 | Sun ..................... H04W 72/04 370/329 |
| 2013/0308450 A1* | 11/2013 | Zhou .................. H04W 12/08 370/230 |

OTHER PUBLICATIONS

"3$^{rd}$ Generation Partnership Project; Technical Specification Group Services and System Aspects; Architecture enhancements for non-3GPP accesses (Release 11)," 3GPP TS 23.402 V11.2.0, pp. 1-251, XP050625450, (Mar. 2013).

3$^{rd}$ Generation Partnership Project; Technical Specification Group Services and System Aspects; Study on S2a Mobility based on GTP & WLAN access to EPC (SaMOG); Stage 2 (Release 11). 3GPP TR 23.852 V1.0.0, pp. 1-40, XP050554477, (Dec. 2011).

International Search Report for PCT/IB2013/000699 dated Jan. 2, 2014.

* cited by examiner

METHOD OF MANAGING DATA BEARERS IN A WIRELESS ACCESS DEVICE AND UES

TECHNICAL FIELD

The invention relates to wireless communication technologies, especially relates to a radio access network.

BACKGROUND OF THE ART

The rapid growth of mobile data is heavily stressing the mobile cellular network, especially the radio access network. The radio access capacity urgently needs to be enhanced to meet the ever-increasing demanding. Meanwhile, the WLAN (wireless local network) market gradually grows. And, the convergence of a WLAN and a cellular network becomes an effective way to increase the radio access capacity.

One of the cellular-WLAN convergence solutions is to integrate a WLAN AP (access point) and a mobile cellular base station into a combo box (called as converged access node), so that the UE with dual-mode access capability may access the combo box via two radio interfaces. And the data traffic can be simultaneously transmitted via the two radio interfaces. The co-located WLAN AP and the base station have a common backhaul link connected to the mobile core network, and provide more capacity to the coverage area.

However, in such a multi-radio access environment with converged radio access, how to set up and manage radio bearers over a WLAN, e.g. a Wi-Fi radio interface, to conceal the connectionless-oriented Wi-Fi radio link in the lower layer, and enable the common IP and other upper layer applications for both radio interfaces, is still a critical problem to be solved.

SUMMARY OF THE INVENTION

The invention intends to enable transporting mobile IP traffic flows over radio links of a mobile cellular network and Wi-Fi radio links, in a heterogeneous network environment with multi-radio access technology, so that the radio access capacity can be increased. One of invention concepts of the invention is to use VLAN to achieve the transportation of data radio bearers over Wi-Fi links, especially employing a VLAN tag as the identification of the Wi-Fi radio bearer. The Wi-Fi radio bearer can be dynamically established and managed by the signaling transported over the Wi-Fi radio interface between the UE and the converged access node.

According to an aspect of the invention, a method of managing data bearers in a wireless access device is provided, the access device integrates the access functions of a first bearer network and a second bearer network, and the method comprises the following steps:

a. maintaining a radio bearer with UEs, the radio bearer being used for bidirectional data transmission and based on the second bearer network;

b. maintaining a backhaul data bearer with the connected serving gateways of the first bearer network;

c. binding the radio bearer and the backhaul data bearer.

According to this aspect, the backhaul data bearer of the first bearer network can be converged seamlessly with the access radio bearer of the second bearer network, thus, the heterogeneity of radio interfaces is invisible to the IP or upper layer applications of a base station and a UE. And, the first bearer network interface and the second bearer network interface have a common IP and a common backhaul. The mobile IP traffic flows, originally transported over the first bearer network, can be transported over the radio bearer of the second bearer network, without implementing any modifications to the IP and other upper layer applications as well as to the radio interface. Besides, the management signaling of the second bearer network is only transported over the second bearer network, and between an access device and UEs, the existing signaling of the first bearer network needn't be modified. UEs supporting the second bearer network still can access the service of first bearer network.

In a preferred embodiment, the first bearer network is a cellular wireless mobile network, and the second bearer network is a WLAN.

This preferred embodiment is suitable to an application in the convergence network of a cellular mobile communication network and a WLAN, especially suitable to an application in the convergence network of the LTE/LTA-A cellular mobile communication network and a Wi-Fi WLAN.

In a further embodiment, the step a takes a unique indicator of the Wi-Fi data frames to identify the Wi-Fi radio bearer;

the step c sets up a mapping between the unique indicator with a transmission channel identification of the backhaul data bearer;

in the data plane, the method still comprises the following steps:

i. for the data packet with the unique indicator, received from the UE via a Wi-Fi interface, adding a bearer identifier of the backhaul data bearer to the payload part, and transmitting the data packet to the serving gateway via the backhaul data interface;

ii. for the data packet with the tunnel endpoint identifier of the backhaul data bearer, received from the serving gateway, adding the unique indicator to the payload part, and transmitting the data packet to the UE via the Wi-Fi interface.

This embodiment provides more a detailed scheme of binding, and provides a processing, in the data plane, needed to be performed for the data based on such binding.

In a further embodiment, the step a maintains a VLAN with the UEs, based on the Wi-Fi, as the Wi-Fi radio bearer, and, taking the identification of the radio bearer as the least significant bit of a VLAN tag of the VLAN, to identify the Wi-Fi radio bearer; the bearer identifier of the backhaul data bearer is the tunnel endpoint identifier that is set up between the access device and the serving gateway.

This embodiment uses a VLAN and VLAN tags to identify the Wi-Fi radio bearer. Since the existing WLAN already supports VLAN and VLAN tags, the existing WLAN packaging and depackaging technologies/components may be used to realize this embodiment of the invention, and this embodiment is with a better compatibility.

In a further embodiment, the method comprises the following steps:

receiving from a mobile management entity a radio access bearer setup request message requiring to set up the radio access bearer between the UE and the serving gateway;

The step a sets up the Wi-Fi radio bearer with the UEs, and comprises:

According to the radio access bearer setup request message, generating a Wi-Fi radio bearer configuration message, the message comprising the related information of the radio bearer identification and data traffic flows of the upper layer;

Transmitting the Wi-Fi radio bearer configuration message to the UE via the Wi-Fi interface;

Receiving the Wi-Fi radio configuration response message transmitted from the UE via the Wi-Fi interface, and setting up the Wi-Fi radio bearer;

The step c sets up the backhaul data bearer with the serving gateways;

The method still comprises the following step:

according to the Wi-Fi radio configuration response message, generating a radio access bearer setup response, and transmitting the response to the mobile management entity.

The embodiment provides detailed steps of setting up a Wi-Fi radio bearer.

Correspondingly, in the second aspect of the invention, it is provided a method of managing the radio bearer in UEs, the UEs integrate the access functions of a first bearer network and a second bearer network is provided, and the method comprises the following steps:

a. maintaining a radio bearer with a wireless access device, the radio bearer being based on the first bearer network, wherein, in the wireless access devices, the radio bearer and a backhaul data bearer, between the wireless access devices and a serving gateway, are bound;

b. binding data traffic flows of corresponding upper layer with the radio bearer.

BRIEF DESCRIPTION OF DRAWINGS

By reading the detailed description of the non-limiting embodiment referring to the following drawings, other features, purposes and advantages of the invention will become clearer.

Figure 1:
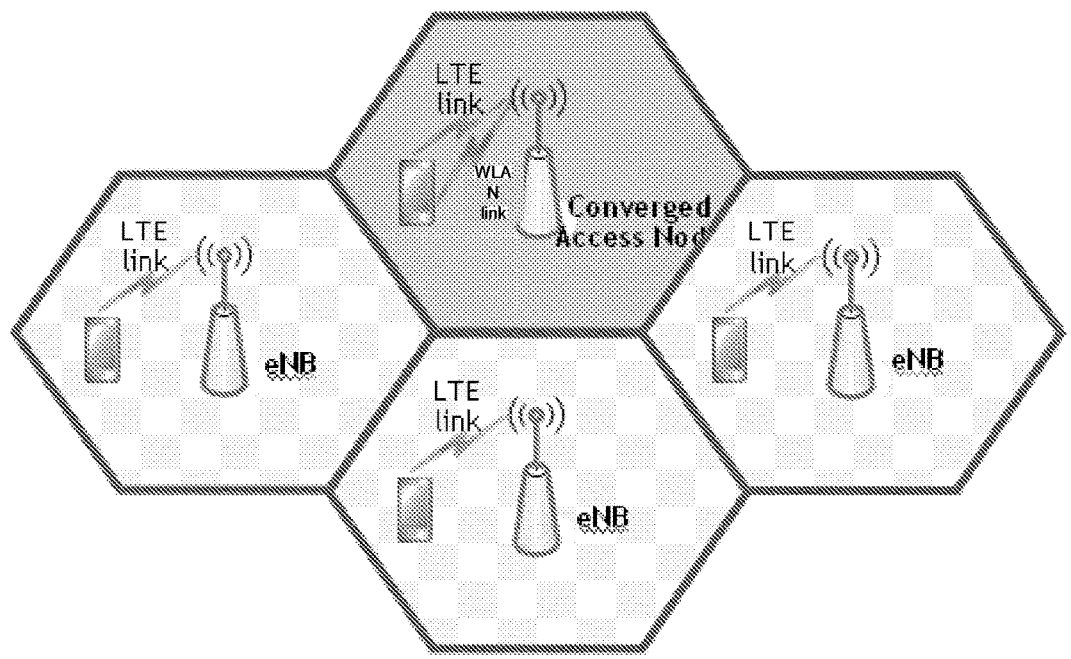
FIG. 1 shows an exemplary wireless access network with multiple radio access modes.

In the drawings, the same or similar reference signs represent the same or similar step features or component (module) features.

DETAILED EMBODIMENT

The invention provides a method of managing data bearers in a wireless access device, the access device integrates the access functions of a first bearer network and a second bearer network, the method comprises the following steps:

a. maintaining a radio bearer with UEs, the radio bearer being used for bidirectional data transmission and based on the second bearer network;

b. maintaining a backhaul data bearer with the connected serving gateways of the first bearer network;

c. binding the radio bearer and the backhaul data bearer.

Preferably, a cellular mobile network is the first bearer network, and a WLAN is the second bearer network. More preferably, it takes a LTE cellular mobile network and a Wi-Fi WLAN as an example to elucidate embodiments of the invention. It may be understood that the invention is not limited thereto, the cellular mobile network such as 3G or WiMAX network etc. may still be the first bearer network, and the WLAN such as WAPI network etc. may still be the second bearer network.

FIG. 1 shows an exemplary multi-access wireless network, wherein, the converged access node is deployed in an area with dense population to enhance the capacity; while the adjacent cells are covered by ordinary LTE eNB to provide basic wireless access in the suburbs or other areas with sparse population. The converged access node is equipped with two radio interfaces: it combines a LTE eNB and a WLAN AP, such as a Wi-Fi AP, and provides a wireless access via both of the two radio interfaces. This converged access node belongs to the wireless access device integrating the access functions of a first bearer network and a second bearer network.

Figure 2:
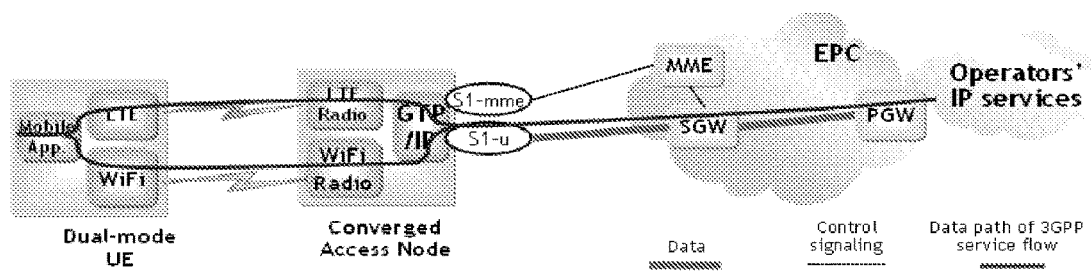
FIG. 2 shows the access architecture of a multi-access radio convergence network.

FIG. 2 shows the architecture of a network with converging multi-radio access. It comprises a wireless access network with dual-mode UEs and a converged access node with dual radio interfaces, and a mobile core network (EPC: Evolved Packet Core) for connecting a packet-switched service network. The dual-mode UE may be a portable equipment, a laptop computer, a notebook computer, and a personal digital assistant (PDA) that respectively include a Wi-Fi network card and a 3GPP LTE access module. In the control plane, the converged access node connects to a MME (mobile management entity) via a S1-MME interface; in the data plane, the converged access node connects to a SGW (serving gateway) via a S1-u interface, then connects to a PGW (packet data network gateway), and then connects to the IP network of a operator.

Figure 3:
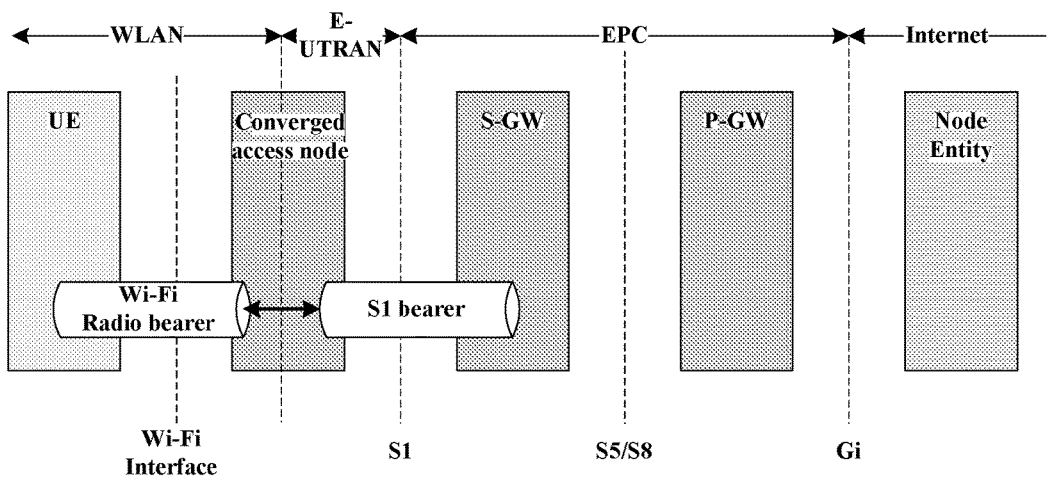
FIG. 3 shows a schematic diagram of managing a data bearer in a wireless access device according to the invention.

FIG. 3 shows a diagram of managing data bearers in a wireless access device according to the invention. The bearer defined in the 3GPP standard is used to transmit/receive user data according to a contracted or negotiated QoS. It is an information transmitting path according to the negotiated QoS. The bearer service includes a control signaling function for QoS negotiation, a bearer generation function according to QoS negotiation, and a user data exchange function through the generated bearer. Wherein, the S1 bearer between a converged access node and a SGW is stipulated in the existing standard, and it is used for transporting data between a converged access node and a SGW. In the embodiment of the invention, the converged access node maintains the S1 bearer with a SGW as a backhaul data bearer.

And, the converged access node still sets up and maintains a Wi-Fi radio bearer with UEs, being used for bidirectional data transmission, as the radio bearer.

In detail, the dual-mode UE with a WLAN function performs the QoS negotiation in relation to the radio resource allocation with the converged access node, and according to the QoS negotiation, a radio channel is established between the dual-mode UE and the converged access node according to the negotiated QoS. The WLAN bearer service includes a radio channel formation and management function, and a user data transmitting function according to the negotiated QoS. That is, the user data are exchanged through the radio channel, between the dual-mode UE and the converged access node, supporting the negotiated QoS.

In the embodiment adopting Wi-Fi as WLAN, preferably, the converged access node takes a unique indicator of the Wi-Fi data frames to identify the Wi-Fi radio bearer. In a more preferably embodiment, the converged access node uses a VLAN as the radio bearer. The VLAN ID serves as the identity of the Wi-Fi radio bearer (RB_ID) and the logical transport channel. The Wi-Fi RB_ID/VLAN ID should be encapsulated in all the packets transported over Wi-Fi, thus the converged access node can identify each traffic flow.

Figure 4:
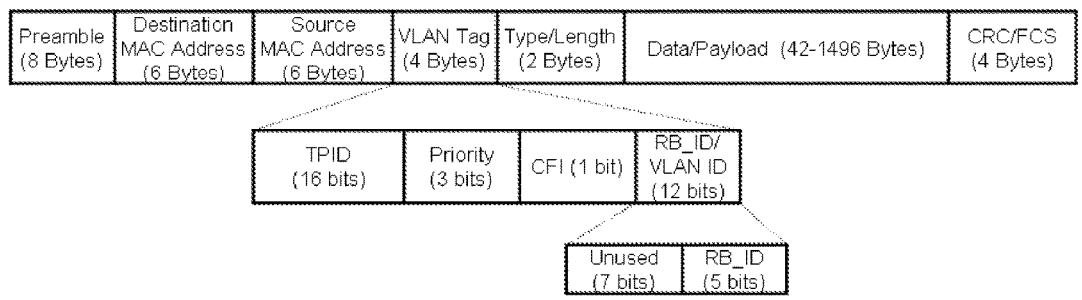
FIG. 4 shows an exemplary Wi-Fi MAC frame structure according to the invention.
Figure 5:
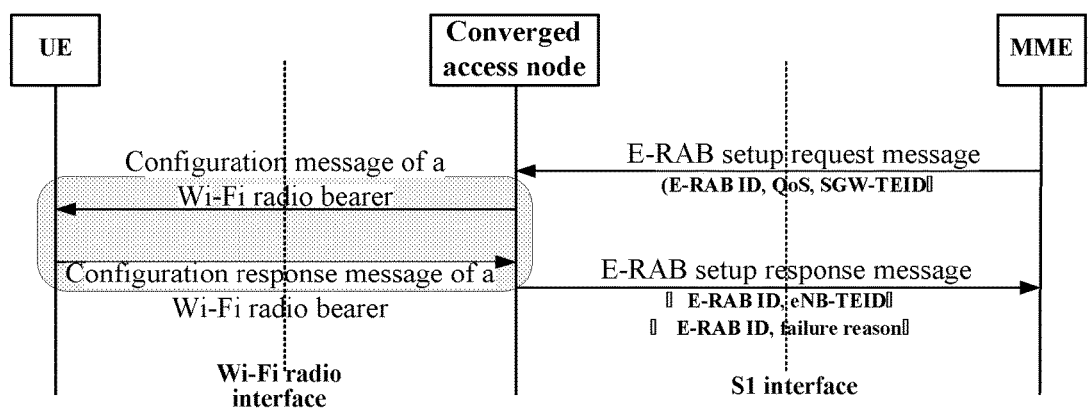
FIG. 5 shows the message procedure of setting up a Wi-Fi radio bearer according to the invention.

An exemplary Wi-Fi MAC frame structure is shown in FIG. 4. The VLAN ID in a VLAN tag is 12 bits. RB_ID is 5 bits in 3GPP standard. The RB_ID shall be encapsulated in the 5 least significant bits of a VLAN ID, and the 7 most significant bits are not used. It does not have any impact to the existing implementation of IP or other upper layer applications, as well as to the corresponding relations between the data radio bearer and other aforementioned bearers for end to end services.

And, the converged access node binds the Wi-Fi radio bearer and the S1 bearer. In the above embodiments, the converged access node sets up the mapping between the unique indicator of the Wi-Fi, e.g. a VLAN ID, and the transport channel identification of the backhaul data bearer, e.g. the tunnel endpoint identifier (TEID) of a SGW.

In the data plane, when implementing data switching:

For the uplink, after the converged access node receives, from the UE, the data packet belonged to this VLAN via a Wi-Fi interface, i.e. the MAC frame as the format of FIG. 4 with this VLAN ID, the converged access node removes the MAC frame header, adds to the payload part the backhaul data packet header including the bearer identifier TEID of the S1 backhaul data bearer, and transmits it to the SGW via the backhaul data interface;

While for the downlink, the converged access node receives, from the SGW, data with the tunnel endpoint identifier TEID of the backhaul data bearer, the converged access node removes the backhaul data packet header including the TEID, adds to the payload part the MAC framer header including the VLAN ID, i.e. placing it into the VLAN to form the frame shown as FIG. 4, and the converged access node transports to the UE over the Wi-Fi interface.

It may be understood that the above embodiment using a VLAN to identify the Wi-Fi radio bearer is only a preferred mode, which uses the VLAN technology supported by the current Wi-Fi to implement the embodiment of the invention. While there are other embodiments for the invention, e.g. adding some field in a Wi-Fi MAC frame or identifying the Wi-Fi radio bearer in the existing field.

Correspondingly, UEs also need to maintain the Wi-Fi radio bearer with the converged access node. And, UEs bind data traffic flows of corresponding upper layer with the Wi-Fi radio bearer. Thus, the data traffic flows of the upper layer can be transported to the converged access node via the Wi-Fi interface, and then be transported seamlessly through the converged access node via S1 backhaul data bearer.

In a detailed embodiment, the same as the converged access node, a UE identifies the Wi-Fi radio bearer by using the unique indicator, and the UE sets up a mapping between the unique indicator with an identification of an upper layer application.

In a more detailed embodiment, the same as the converged access node, a UE identifies the Wi-Fi radio bearer by using the VLAN with a VLAN ID, and uses a RB_ID as the least significant bits of a VLAN tag of the VLAN, shown as FIG. 4. And, a UE takes the port number of an upper layer application, e.g. a TCP/UDP port number, as the identification of the upper layer application. Then, the UE sets up the mapping of the VLAN ID and the port number of the upper layer application.

In the data plane, when implementing data switching:

For the uplink, after adding the corresponding unique indicator to the data traffic flows from an upper layer, i.e. forming the MAC frame shown as FIG. 4, the UE transports it to the converged access node via a Wi-Fi interface.

For the downlink, after receiving the Wi-Fi data packet with the unique indicator shown as FIG. 4 via a Wi-Fi interface, the UE provides the data payload for the corresponding upper layer.

The above describes the method of binding a bearer in a converged access node and a UE according to the invention, and the data processing method in the data plane based on the bound bearer. The following will describe the method of setting up a radio bearer between a converged access node and a UE.

First, the converged access node receives an E-RAB setup request message used for setting up a E-RAB (E-UTRAN radio access bearer) sent by the MME, and the message includes an identification (E-RAB ID) of the E-RAB to be set up and QoS. The converged access node will try to set up a radio bearer over Wi-Fi.

In detail, it first generates a configuration message of a Wi-Fi radio bearer, and the message includes information such as the radio bearer identification RB_ID identified by a VLAN tag, and QoS negotiation.

Then, the converged access node transmits the configuration message of a Wi-Fi radio bearer to a UE via a Wi-Fi interface, and the UE receives the configuration message of a Wi-Fi radio bearer.

Next, the UE sets up a Wi-Fi radio bearer, e.g. it sets up a VLAN as indicated by the message, and maps the Wi-Fi radio bearer to an upper layer.

Subsequently, the UE transmits a configuration response message of a Wi-Fi radio bearer back to the converged access node, to confirm the established Wi-Fi radio bearer.

And the converged access node receives the configuration response message of a Wi-Fi radio bearer transmitted by the UE, and it also sets up a Wi-Fi radio bearer.

In addition, the E-RAB setup request message, which is transmitted by the MME to the converged access node, further includes a tunnel endpoint identification of a SGW (SGW-TEID), and the converged access node maps the VLAN ID with the TEID as the above described, thereby binding the Wi-Fi radio bearer with the maintained S1 bearer.

Finally, the converged access node generates an E-RAB setup response message, and transmits the message to the MME to inform the MME: already setting up the data radio bearer, in the wireless interface, corresponding to the E-RAB, and the message further includes the tunnel endpoint identification of the converged access node (eNB-TEID).

Later, in the data plane, the IP data packet can be transported over a Wi-Fi radio bearer between the converged access node and the dual-mode UE with a WLAN function. It needs to be noted that the MME is unaware of the Wi-Fi wireless interface.

In the case that the Wi-Fi radio bearer can not be set up, the converged access node also informs the MME of the reason why the data radio bearer corresponding to the E-RAB can not be set up.

Similarly, it can implement the operation such as modification and release etc. to the Wi-Fi access bearer between the converged access node and a UE by using the message over the Wi-Fi interface, e.g. modifying a cipher key etc. and the invention will not describe further.

It needs to specify that, in the case of non-conflict, the embodiments of the application and the features in the embodiments may be combined with each other. Certainly, there are other multiple embodiments in the invention, without departing from the spirit and essence, the technicians familiar with the field may make all kinds of corresponding changes and deformations according to the invention, while the corresponding changes and deformations should belong to the protect range of the claims attached by the invention.

The ordinary technicians of the field may understand all or partial steps in the above methods through programs commanding related hardware to achieve, the programs may be stored in readable storage medium of a computer, e.g. a read-only memory, disk or CD-ROM etc. Optionally, all or partial steps in the above embodiments may use one or multiple integrated circuits to achieve. Correspondingly, each module/unit in the above embodiments may take the hardware form to realize, either take the form of software function module to achieve. The invention isn't limited to any specific forms of combination of hardware and software.

What is claimed is:

1. A method of managing data bearers in a wireless access device, the access device integrating access functions of a first bearer network and a second bearer network, the method comprising:
   maintaining a radio bearer with UEs, the radio bearer being used for bidirectional data transmission and based on the second bearer network;
   maintaining a backhaul data bearer with a connected serving gateway of the first bearer network;
   binding the radio bearer and the backhaul data bearer;
   wherein the first bearer network is a cellular wireless mobile network, and the second bearer network is a WLAN;
   wherein the WLAN is a Wi-Fi network, and the maintaining a radio bearer with UEs takes a unique indicator of Wi-Fi data frames to identify a Wi-Fi radio bearer; and
   wherein, the maintaining a radio bearer with UEs maintains a Wi-Fi based VLAN between the access device and UEs as the Wi-Fi radio bearer, and
   the method further comprises taking the identification of the radio bearer as a least significant bit of a VLAN tag of the VLAN to identify the Wi-Fi radio bearer;
   wherein the bearer identifier of the backhaul data bearer is a tunnel endpoint identifier that is set up between the access device and the serving gateway.

2. A method of managing data bearers in a wireless access device, the access device integrating access functions of a first bearer network and a second bearer network, the method comprising:
   maintaining a radio bearer with UEs, the radio bearer being used for bidirectional data transmission and based on the second bearer network;
   maintaining a backhaul data bearer with a connected serving gateway of the first bearer network;
   binding the radio bearer and the backhaul data bearer;
   wherein the first bearer network is a cellular wireless mobile network, and the second bearer network is a WLAN;
   wherein the WLAN is a Wi-Fi network, and the maintaining a radio bearer with UEs takes a unique indicator of Wi-Fi data frames to identify a Wi-Fi radio bearer and
   wherein
   the binding the radio bearer and the backhaul data bearer sets up a mapping between the unique indicator with a transmission channel identification of the backhaul data bearer;
   in a data plane, the method comprises:
   for a data packet with the unique indicator, received from the UE via a Wi-Fi interface, adding a bearer identifier of the backhaul data bearer to a payload part, and transmitting the data packet to the serving gateway via a backhaul data interface;
   for the data packet with a tunnel endpoint identifier of the backhaul data bearer, received from the serving gateway, adding the unique indicator to the payload part, and transmitting the data packet to the UE via the Wi-Fi interface.

3. A method of claim 2, wherein, the maintaining a radio bearer with UEs maintains a Wi-Fi based VLAN between the access device and UEs as the Wi-Fi radio bearer, and
   the method further comprises taking the identification of the radio bearer as a least significant bit of a VLAN tag of the VLAN to identify the Wi-Fi radio bearer;
   wherein the bearer identifier of the backhaul data bearer is the tunnel endpoint identifier that is set up between the access device and the serving gateway.

4. A method of claim 3, further comprising:
   receiving from a mobile management entity a radio access bearer setup request message requiring to set up the radio access bearer between the UE and the serving gateway;
   the maintaining a radio bearer with UEs setting up the Wi-Fi radio bearer with the UEs, and comprising:
      generating a Wi-Fi radio bearer configuration message according to the radio access bearer setup request message, the Wi-Fi radio bearer configuration message comprising information related to the radio bearer identification and data traffic flows of an upper layer;
      transmitting the Wi-Fi radio bearer configuration message to the UE via the Wi-Fi interface;
      receiving a Wi-Fi radio configuration response message transmitted from the UE via the Wi-Fi interface, and setting up the Wi-Fi radio bearer;
   the binding the radio bearer and the backhaul data bearer setting up the backhaul data bearer with the serving gateways; and
   the method further comprising:
   generating a radio access bearer setup response according to the Wi-Fi radio configuration response message, and transmitting the radio access bearer setup response to the mobile management entity.

5. A method of managing the radio bearer in UEs, the UEs integrating access functions of a first bearer network and a second bearer network, the method comprising:
   maintaining a radio bearer with a wireless access device, the radio bearer being based on the first bearer network, wherein, in the wireless access device, the radio bearer and a backhaul data bearer, between the wireless access device and a serving gateway, are bound;
   binding data traffic flows of a corresponding upper layer with the radio bearer;
   wherein the first bearer network is a cellular mobile wireless network, and the second bearer network is a WLAN;
   wherein the WLAN is a Wi-Fi network, and the maintaining a radio bearer takes a unique indicator to identify a Wi-Fi radio bearer;
   wherein, the maintaining a radio bearer maintains a Wi-Fi based VLAN between the UE and the wireless access device, as the Wi-Fi radio bearer, and
   the method further comprises taking the identification of the radio bearer as a least significant bit of a VLAN tag of the VLAN to identify the Wi-Fi radio bearer;

the identification of the upper layer application is a TCP/UDP port number;
and the providing comprises:
removing the VLAN tag of the VLAN carried by Wi-Fi data packets and providing the data packets for the upper layer.

6. A method of managing the radio bearer in UEs, the UEs integrating access functions of a first bearer network and a second bearer network, the method comprising:
maintaining a radio bearer with a wireless access device, the radio bearer being based on the first bearer network, wherein, in the wireless access device, the radio bearer and a backhaul data bearer, between the wireless access device and a serving gateway, are bound;
binding data traffic flows of a corresponding upper layer with the radio bearer;
wherein the first bearer network is a cellular mobile wireless network, and the second bearer network is a WLAN;
wherein the WLAN is a Wi-Fi network, and the maintaining a radio bearer takes a unique indicator to identify a Wi-Fi radio bearer;
wherein the binding comprises:
setting up a mapping between the unique indicator with an identification of an upper layer application;
in a data plane, the method comprises:
providing the corresponding upper layer with Wi-Fi data packets with the unique indicator, received from a Wi-Fi interface from the wireless access device;
adding the corresponding unique indicator to the data packets from the upper layer, and then transmitting the data packets to the wireless access device via the Wi-Fi interface.

7. A method of claim 6, wherein, the maintaining a radio bearer maintains a Wi-Fi based VLAN between the UE and the wireless access device, as the Wi-Fi radio bearer, and
the method further comprises taking the identification of the radio bearer as a least significant bit of a VLAN tag of the VLAN to identify the Wi-Fi radio bearer;
the identification of the upper layer application is a TCP/UDP port number;
and the providing comprises:
removing the VLAN tag of the VLAN carried by the Wi-Fi data packets and providing the data packets for the upper layer.

8. A method of claim 7, further comprising:
receiving a Wi-Fi radio bearer configuration message from the wireless access device via the Wi-Fi interface, the message comprising information related to the radio bearer identification and data traffic flows of the upper layer;
setting up the Wi-Fi radio bearer, and transmitting a Wi-Fi radio configuration response back to the wireless access device.

9. A method of claim 1, further comprising:
receiving from a mobile management entity a radio access bearer setup request message requiring to set up the radio access bearer between the UE and the serving gateway;
the maintaining a radio bearer with UEs setting up the Wi-Fi radio bearer with the UEs, and comprising:
generating a Wi-Fi radio bearer configuration message according to the radio access bearer setup request message, the Wi-Fi radio bearer configuration message comprising information related to the radio bearer identification and data traffic flows of an upper layer;
transmitting the Wi-Fi radio bearer configuration message to the UE via the Wi-Fi interface;
receiving a Wi-Fi radio configuration response message transmitted from the UE via the Wi-Fi interface, and setting up the Wi-Fi radio bearer;
the binding the radio bearer and the backhaul data bearer setting up the backhaul data bearer with the serving gateways; and
the method further comprising:
generating a radio access bearer setup response according to the Wi-Fi radio configuration response message, and transmitting the radio access bearer setup response to the mobile management entity.

10. A method of claim 5, further comprising:
receiving a Wi-Fi radio bearer configuration message from the wireless access device via the Wi-Fi interface, the message comprising information related to the radio bearer identification and data traffic flows of the upper layer;
setting up the Wi-Fi radio bearer, and transmitting a Wi-Fi radio configuration response back to the wireless access device.

* * * * *